3,280,059
LATEX PAINTS CONTAINING ZIRCONYL SALTS OF MONOCARBOXYLIC ACIDS
Mathias Giesen, Bensheim, Germany, assignor to Carlisle Chemical Works, Inc., Reading, Ohio
No Drawing. Filed Dec. 11, 1964, Ser. No. 417,809
3 Claims. (Cl. 260—23.7)

This invention relates to improved water-base dispersion paints and this application is a continuation-in-part of my application Serial No. 94,169, filed March 8, 1961, now abandoned.

Such aqueous systems are assuming an ever increasing importance for interior and exterior coatings, for instance in hospitals, as house paints and wood finishes, and for many other purposes. As they produce specific surface effects, their field of application extends partially beyond that of oil paints. The water dispersion paints are distinguished over the oil paints for instance by an increased water permeability and tend, therefore, less to peeling.

Dispersion paints are generally prepared as follows: Inorganic or organic pigments, such as titanium dioxide, lithopone, iron or chromium oxide dyes, ultramarine, phthalocyanine and the like are, individually or as mixtures in any proportions, converted mechanically in the presence of wetting agents into a very fine aqueous dispersion of pasty consistency. Fillers like talcum, chalk, kaolin, and the like may be added, if desired. Such pigment pastes are then stirred into an aqueous resin dispersion after it has been thickened, if necessary, to the desired viscosity by addition of a suitable thickener such as methyl cellulose, casein, and the like. Suitable aqueous resin dispersions are those of homopolymers and co-polymers, such as polyvinyl acetate, polyvinyl propionate, polyacrylic esters, and styrene-butadiene copolymers. If the compositions tend to foaming, anti-foaming agents such as silicon oils may be added.

Paint coatings made from such dispersion paints have a relatively low wet scrub resistance, adhesion, and weather resistance. Attempts have been made to overcome said drawbacks by adding to the aqueous paints, either prior or subsequent to their preparation, organic solvents such as toluene, benzine, and the like. Such additions improve, however, only the water resistance; they hardly affect the wet scrub resistance, and have no influence on the weather resistance. Furthermore, such additions can be applied only in small amounts of about 3 to 5%.

It is a principal object of the invention to provide water-base dispersion paints of improved wet scrub resistance, adhesion, and weather resistance.

Other objects and advantages will be apparent from a consideration of the specification and claims.

According to the invention, the recited properties are greatly improved by the addition of zirconyl salts of naphthenic acids or of aliphatic acids having 8 to 10 carbon atoms. Said salts are preferably prepared according to the methods disclosed in U.S. Patents Nos. 2,739,902 and 2,739,905, and in German Patent No. 845,800. They are used in such amounts that the Zr content of the paint coatings is about 0.02 to 0.4 percent, calculated on the resin.

For addition to the paint dispersion, the zirconyl compounds may be converted, by means of emulsifiers, to an aqueous suspension which is mechanically incorporated into the dispersions. In another procedure, the zirconyl compounds may be dissolved in an organic solvent, preferably a hydrocarbon solvent, and the obtained solution is then emulsified into the paint dispersion, or it is first converted, by means of an emulsifier, into an aqueous emulsion which is then added to the paint dispersion. The zirconyl salt emulsion is preferably prepared in such a way that the solution of the zirconyl compounds is emulsified in water with vigorous stirring and addition of emulsifiers.

Suitable emulsifiers are compounds on the basis of fatty acid esters of monobasic or polybasic alcohols, polyalkylene glycol ethers or esters, or sulfonated or sulfated higher alcohols and salts thereof, or other conventional anionic and non-ionic dispersing agents.

The emulsions which contain the zirconyl compounds have the advantage that, e.g. at a zirconium content of about 1 to 12 percent, they are stable in the pH range of about 3 to 10 and cold stable down to about −10° C. Therefore, the emulsions can be stored without risk and are readily incorporated in the dispersion paints.

The zirconyl compounds may also be added during the preparation of the pigment paste, either as such or in form of a solution or emulsion. In such case, the wetting agent, otherwise required for the preparation of the pigment paste, may be wholly or partially omitted.

It has already been proposed to add certain zirconium compounds to emulsion paints to reduce the washoff of freshly applied paints, whereby it had been found that organic zirconium compounds such as zirconium linoleate were much less effective than ammonium zirconyl carbonates.

It has also been proposed to use zirconium salts of organic acids as booster driers in emulsion paints and enamels.

In both cases, the zirconium compounds were used in combination with conventional driers, particularly cobalt driers, and they were incorporated in systems where the oil base had to be dried to the paint film by chemical autoxidation and where the rate of said autoxidation was improved by the drier system.

In contrast thereto, the dispersion paints here involved form the paint film not by a chemical reaction but in a purely physical manner, essentially by evaporation of water and aggregation of the resin particles, and there was no reason to expect any improvement of such drier-free dispersion paints by the addition of zirconium.

The following examples are given to illustrate the invention. All parts are given by weight.

EXAMPLE 1

Dispersion paint white on polyvinyl acetate base. A pigment paste was prepared from

| | Parts |
|---|---|
| Rutile (TiO$_2$) | 60 |
| Barium sulfate precipitate | 78 |
| Talcum | 3.8 |
| Chalk | 2.2 |
| Wetting agent | 0.75 |
| Water | 35.25 | and incorporated into 90 parts of a polyvinyl acetate dispersion (54% solids).

Three equal batches of such dispersions were prepared and the following different additions were made:
(1) No additive.
(2) 0.729 part of a zirconyl 2-ethyl hexoate solution in toluene; Zr content 20%.

(3) 2.43 parts of zirconyl 2-ethyl hexoate in form of an aqueous emulsion; Zr content 6%.

*Wet scrub resistance test*

The tests were made with a conventional test machine, whereby the wash brush was loaded with 500 g. and water was continuously supplied during scrubbing.

The dispersion paint films were applied at 100 mils wet thickness to hard fiber board panels of 120 x 80 x 4 mm. The films were tested after 48 hours air drying.

Results:

Sample 1—Slight destruction after 1230 cycles; after 1740 cycles, increased destruction; after 5050 cycles, larger areas were rubbed off down to the board surface.

Sample 2—Slight destruction of the film after 2300 cycles. Somewhat increased destruction after 5050 cycles.

Sample 3—No change of the film after 5050 cycles.

*Adhesion test*

The adhesion was tested by applying to the same hard fiber boards first two coats each of 100 mils wet thickness. A muslin strip was placed on the second film while still wet, which strip was narrower by 1 cm. than the width of the film. After the second film had dried and the muslin strip was firmly anchored therein, a third film of 100 mils wet thickness was applied. After 3 days further drying time, weights were suspended on the muslin strips protruding 7.5 cm. from the vertically suspended boards.

Varying loads caused more or less strongly tearing of the muslin strips which was measured to a length of 10 cm.

Test results:

| | Kg. |
|---|---|
| Sample 1 | 5.8 |
| Sample 2 | 6.7 |
| Sample 3 | 7.6 |

EXAMPLE 2

Dispersion paint white (acrylic resin base). A pigment paste was prepared from

| | Parts |
|---|---|
| Titanium dioxide | 60 |
| Blanc fixe | 78 |
| Talcum | 3.8 |
| Chalk | 2.2 |
| Polyethyleneglycol oleic acid ester | 0.38 |
| Silicone oil | 0.15 |
| Water | 25.25 | and incorporated in 90 parts of a mixed emulsion of equal parts of polymethyl methacrylate and polyethyl acrylate (46% solids).

Four equal batches of such dispersion were prepared, and the following different additions were made:

(1) No additive.

(2) 0.193 part of zirconyl caprylate solution (7% Zr), dissolved in benzine hydrocarbons.

(3) 0.45 part of zirconyl naphthenate dissolved in trichloroethylene (20% Zr).

(4) 0.4 part of powdery zirconyl 2-ethylhexoate (33.3% Zr).

The wet scrub resistance test was made as set forth in Example 1. Drying time of the film 24 hours.

Test results:

Sample 1—Destruction began after 500 cycles. After 910 cycles, increased destruction. Badly destroyed down to the board surface after 1470 cycles.

Sample 2—Destruction of film starts after 800 cycles. Destruction increases after 1340 cycles. Badly destroyed down to the board surface after 2180 cycles.

Sample 3—Destruction of film starts after 1130 cycles. Increased destruction after 1710 cycles. Badly destroyed to board surface after 2520 cycles.

Sample 4—Destruction of film starts after 1410 cycles. Increased destruction after 2080 cycles. Badly destroyed down to board surface after 3300 cycles.

*Adhesion test*

Procedure as set forth for Example 1.
Results:

| | Kg. |
|---|---|
| Sample 1 | 6.5 |
| Sample 2 | 7.2 |
| Sample 3 | 7.8 |
| Sample 4 | 8.9 |

A repetition of this test series with a formulation where a copolymer of methyl acrylate and methyl methacrylate was used as resin, gave substantially the same results.

EXAMPLE 3

Dispersion paint white (styrene-butadiene base). Batches of a pigment paste were prepared from

| | Parts |
|---|---|
| Titanium dioxide | 20 |
| Lithopone | 50 |
| Zinc white | 2 |
| Methyl cellulose | 13.5 |
| Silicone antifoaming agents | 0.05 |
| Sodium hexametaphosphate, 5% | 6 |
| Water | 8.45 |

60 parts of said paste were mixed with 40 parts of a styrene-butadiene dispersion (50% solids), 3 parts of water, and 0.3 part of pine oil.

On addition of the zirconyl compounds used in Examples 1 and 2, an improved wet scrub resistance was observed, particularly with addition (3) of Example 1; however, as butadiene-styrene emulsion paints have generally a better wet scrub resistance than, for instance, polyvinyl acetate emulsions, the increase of the wet scrub resistance was not as spectacular as in the preceding examples.

The term "wet scrub resistance" is used throughout the specification in its conventional meaning to indicate the toughness of the paint film or the ability of the film-forming particles to coalesce or fuse into a continuous coating.

I claim:

1. A surface coating composition comprising an aqueous dispersion containing a thermoplastic resin selected from the group consisting of polyvinyl acetate, polyvinyl propionate, polyacrylic esters, and styrene-butadiene copolymers, and as an additive a zirconyl salt of an organic acid selected from the group consisting of saturated aliphatic monocarboxylic acids containing 8 to 10 carbon atoms and naphthenic acids in an amount corresponding to a zirconium content of about 0.02 to 0.4 percent by weight of the resin.

2. An emulsion as claimed in claim 1 wherein said zirconyl salt is a salt of 2-ethylhexoic acid.

3. A drier-free aqueous latex paint dispersion containing only non-oxidizable film-forming components forming a paint film by evaporation of water and coagulation, said dispersion containing as essential film-forming ingredient a thermoplastic resin selected from the group consisting of polyvinyl acetate, polyvinyl propionate, polyacrylic esters, and styrene-butadiene copolymers, and as an additive a zirconyl salt of an organic acid selected from the group consisting of saturated aliphatic monocarboxylic acids containing 8 to 10 carbon atoms and naphthenic acids in an amount corresponding to a zirconium content of about 0.02 to 0.4 percent by weight of the resin.

References Cited by the Examiner

UNITED STATES PATENTS

| 2,702,284 | 2/1955 | Brock | 260—28.7 |
| 2,739,902 | 3/1956 | Mack et al. | 106—264 |
| 2,773,850 | 12/1956 | Willis | 260—23 |

LEON J. BERCOVITZ, *Primary Examiner.*

R. A. WHITE, *Assistant Examiner.*